United States Patent
Kahrs et al.

(10) Patent No.: US 7,533,943 B2
(45) Date of Patent: May 19, 2009

(54) METHOD FOR ELECTRODYNAMICALLY BRAKING A RAIL VEHICLE

(75) Inventors: Helmut Kahrs, Pinzberg (DE);
Heinrich Klima, Erlangen (DE);
Michael Schmelz, Kelkheim (DE)

(73) Assignee: Siemens Aktiengesellschaft, Munich (DE)

( * ) Notice: Subject to any disclaimer, the term of this patent is extended or adjusted under 35 U.S.C. 154(b) by 261 days.

(21) Appl. No.: 10/511,392

(22) PCT Filed: Apr. 7, 2003

(86) PCT No.: PCT/DE03/01139

§ 371 (c)(1),
(2), (4) Date: Jun. 22, 2005

(87) PCT Pub. No.: WO03/086809

PCT Pub. Date: Oct. 23, 2003

(65) Prior Publication Data

US 2005/0264103 A1    Dec. 1, 2005

(30) Foreign Application Priority Data

Apr. 18, 2002   (DE) ................................ 102 17 385

(51) Int. Cl.
*B60T 13/00* (2006.01)
(52) U.S. Cl. ................ 303/20; 188/181 A; 701/20
(58) Field of Classification Search ................ 303/20, 303/151, 152; 188/158, 159, 160, 181 A, 188/181 T; 318/371, 375; 701/20, 70
See application file for complete search history.

(56) References Cited

U.S. PATENT DOCUMENTS

| | | | | |
|---|---|---|---|---|
| 3,519,805 | A | * | 7/1970 | Thorne-Booth ............... 701/20 |
| 4,225,813 | A | * | 9/1980 | Sahasrabudhe ............. 318/371 |
| 4,270,716 | A | * | 6/1981 | Anderson ..................... 701/20 |
| 4,302,811 | A | * | 11/1981 | McElhenny ................... 701/20 |
| 4,671,576 | A | * | 6/1987 | Fourie .......................... 303/20 |
| 4,760,529 | A | * | 7/1988 | Takata et al. .................. 701/70 |
| 5,992,950 | A | * | 11/1999 | Kumar et al. ............... 303/151 |
| 6,619,760 | B1 | * | 9/2003 | Anwar .......................... 303/20 |
| 6,625,535 | B2 | * | 9/2003 | Han et al. ..................... 701/70 |

FOREIGN PATENT DOCUMENTS

| | | |
|---|---|---|
| DE | 3228772 A1 | 2/1983 |
| DE | 4107514 A1 | 9/1992 |
| DE | 4225683 C2 | 2/1994 |
| DE | 19823348 A1 | 11/1999 |
| EP | 0321987 A2 | 6/1989 |
| GB | 861973 | 3/1961 |
| JP | 48083510 A | 11/1973 |
| JP | 6276606 A | 9/1994 |
| JP | 7099708 A | 4/1995 |

OTHER PUBLICATIONS

Japanese Office Action dated Aug. 21, 2008.

\* cited by examiner

*Primary Examiner*—Thomas J Williams
(74) *Attorney, Agent, or Firm*—Laurence A. Greenberg; Werner H. Stemer; Ralph E. Locher

(57) ABSTRACT

The invention relates to a method for electrodynamically braking a rail vehicle that is provided with a drive unit (6). According to the inventive method, acceleration ($a_{1st}$) of said rail vehicle is regulated according to the speed (v) thereof.

9 Claims, 1 Drawing Sheet

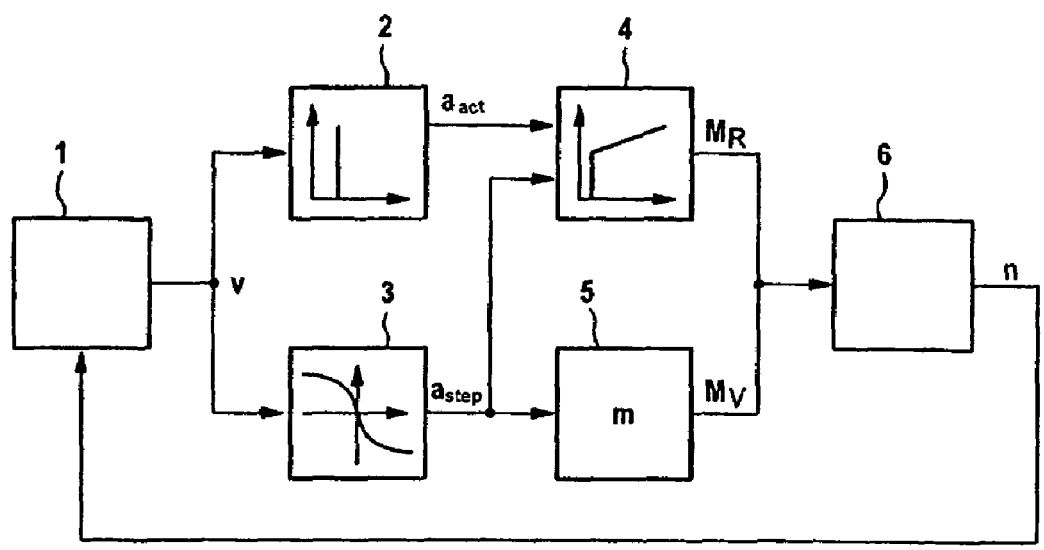

METHOD FOR ELECTRODYNAMICALLY BRAKING A RAIL VEHICLE

CLAIM FOR PRIORITY

This application is a national stage of PCT/DE03/01139, published in the German language on Oct. 23, 2003, which claims the benefit of priority to German Application No. DE 102 17 385.0, filed on Apr. 18, 2002.

TECHNICAL FIELD OF THE INVENTION

The invention relates to a method for electrodynamically braking a rail vehicle which is equipped with a drive, the acceleration of the rail vehicle being controlled as a function of its velocity.

BACKGROUND OF THE INVENTION

Conventionally, an electrodynamic brake was frequently not used to the point where the rail vehicle comes to a standstill. It was feared that the braking force at low speeds were subject to large fluctuations which are due in particular to the route (positive or negative gradient).

An existing mechanical brake has always been used below a velocity of 2 km/h to 7 km/h. This has the disadvantage that when the rail vehicle comes to a standstill there is a jolt which is uncomfortable for the passengers.

A velocity-dependent braking deceleration is known from DE 41 07 514 A1. The significant factor here is to achieve a very short braking distance.

U.S. Pat. No. 4,270,716 discloses a method for accelerating and braking a rail vehicle in which, in order to avoid a jolting mode of travel, the acceleration, which may also be negative when braking, is controlled in such a way that it is proportional to the square root of the velocity.

SUMMARY OF THE INVENTION

The invention discloses an alternative method for electrodynamically braking a rail vehicle which permits safe braking to the point where-the vehicle comes to a standstill so that the mechanical brake which causes an undesired jolt is normally not used and as a result is also subject to less wear.

In one embodiment of the invention, the acceleration is controlled to a set point acceleration which is proportional to the velocity.

Obtaining optimum deceleration (negative acceleration) is possible with a simplified control at any velocity of the rail vehicle, even at a very low velocity. It is therefore possible to bring the rail vehicle to a standstill safely solely using the electrodynamic brakes. The electrodynamic brakes operate advantageously without a jolt.

The relationship in which the acceleration is plotted as a function of the velocity can be stored as a characteristic curve.

The set point acceleration can also be proportional to the velocity for individual sections (route sections or travel time periods) which follow one another. There results a characteristic curve composed of linear sections.

During the braking process, the respective current set point acceleration is determined with the characteristic curve from the velocity of the rail vehicle, and the current acceleration is controlled in such a way that it corresponds as far as possible to the set point acceleration.

Influences of the route being traveled on (positive or negative gradient) are compensated by the control of the acceleration.

For example, the acceleration can be controlled indirectly by controlling the torque of the drive of the rail vehicle. The torque can be controlled comparatively more easily than with direct control of the acceleration.

In order to control the torque it is possible to use, for example, a PI controller.

For example, during the control process it is possible to provide for the torque always to be kept within predefined limits. These limits are predefined, for example, by the driver.

For example, an additional torque, which is proportional to the set point acceleration, is added to the torque for the sake of pilot control. Here, the proportionality constant is dependent on vehicle values.

This provides the advantage that influences which are due to the design of the vehicle itself are ruled out entirely or largely.

The vehicle values are, for example, in particular the vehicle mass, but also the transmission ratio and/or the diameter of the wheels.

The instantaneous velocity of the rail vehicle is determined, for example, from the rotational speeds of the drive and/or of an axle.

The set point acceleration is then determined, for example, using the characteristic curve which represents the set point acceleration as a function of the velocity. The set point acceleration is proportional to the velocity here.

The instantaneous acceleration is determined, for example, as a first derivative of the velocity which is determined. A direct comparison between the instantaneous acceleration and the set point acceleration is then possible, and the acceleration can be controlled.

The drive of the rail vehicle is generally an asynchronous machine with a pulse—controlled inverter. If the drive has a coupling of an I-n model to a U model of an engine, the acceleration can be controlled particularly satisfactorily to a point where the rail vehicle comes to a standstill.

In another embodiment of the invention, there is a method general control of the travel of the rail vehicle. In particular, the method is well suited to braking a rail vehicle to the point where it comes to a standstill without a mechanical brake having to be applied. It is therefore advantageously ensured that the vehicle will stop without a jolt.

BRIEF DESCRIPTION OF THE DRAWINGS

The invention for electrodynamically braking a rail vehicle is explained in more detail with reference to the drawing, in which:

FIG. 1 shows an exemplary embodiment of the present invention.

DETAILED DESCRIPTION OF THE INVENTION

At first the velocity v of the rail vehicle is determined 1. The instantaneous acceleration $a_{act}$ is determined 2 from the velocity value after the first derivative of the velocity profile has been formed.

In parallel with this, the set point acceleration $a_{step}$ is determined 3 from the velocity v using a predefined characteristic curve. According to the characteristic curve, the set point acceleration $a_{step}$ is proportional to the velocity v with the proportionality constant k.

Both the instantaneous acceleration $a_{act}$ and the set point acceleration $a_{step}$ are fed to the controller 4 which may be a PI controller. The torque $M_R$ which is necessary for the desired control of the instantaneous acceleration $a_{act}$ to the set point acceleration $a_{step}$, for the drive 6, is output at the output of the controller 4.

In order to compensate influences due to the rail vehicle itself, an additional torque $M_v$ in addition to the already calculated torque $M_R$ is added before the drive 6 is actuated. This additional torque $M_v$ is determined 5 by the product of the set point acceleration $a_{step}$ and a proportionality constant m, which may be dependent on the vehicle mass, the transmission ratio and/or the diameter of the wheels.

The sum of the torques $M_R+M_V$ is fed to the drive 6 where the acceleration $a_{act}$ of the rail vehicle is controlled by means of the torque $M_R+M_V$.

The rotational speed n of the drive 6 is used to determine the velocity v of the rail vehicle and is made available by the drive 6 in order to determine the velocity 1.

The method described makes it possible to control the acceleration (deceleration) of the rail vehicle in a uniform fashion, in particular to the point where the vehicle comes to a standstill.

The invention claimed is:

1. A method for electrodynamically braking a rail vehicle which is equipped with a drive, the method which comprises:
   determining a linear function and storing the linear function as a characteristic curve representing a dependence of a negative setpoint acceleration on a velocity of the rail vehicle;
   during a braking operation, repeatedly measuring the velocity and the negative acceleration of the rail vehicle;
   controlling, in a closed-loop control process, the measured negative acceleration of the rail vehicle towards the setpoint acceleration taken from the characteristic curve, so as to approach the negative setpoint acceleration.

2. The method as claimed in claim 1, wherein the set point acceleration for individual sections is proportional to the velocity.

3. The method as claimed in claim 1, wherein to control the acceleration indirectly, a torque of the drive is regulated.

4. The method as claimed in claim 3, characterized in that a PI controller is used to control the torque.

5. The method as claimed in claim 3, when the torque is controlled it is kept within predefined limits.

6. The method as claimed in claim 3, wherein an additional torque which is proportional to the set point acceleration is added to the torque, and a proportionality constant is dependent on vehicle values.

7. The method as claimed in claim 6, wherein the vehicle values are vehicle mass, a transmission ratio and/or diameter of the wheels.

8. The method as claimed in claim 1, wherein the velocity of the rail' vehicle is determined from rotational speeds of the drive and/or of an axle.

9. The method as claimed in claim 1, wherein the acceleration is determined as a first derivative of the velocity.

* * * * *